United States Patent [19]

Lackey

[11] Patent Number: 4,546,900

[45] Date of Patent: Oct. 15, 1985

[54] CONTAINER HAVING AN INTERNAL LINER TOGETHER WITH METHOD AND APPARATUS FOR FORMING SUCH CONTAINER

[75] Inventor: Robert W. Lackey, Hickory, N.C.

[73] Assignee: The Mead Corporation, Dayton, Ohio

[21] Appl. No.: 619,793

[22] Filed: Jun. 11, 1984

[51] Int. Cl.⁴ .................. B29D 27/04; B65D 23/02; B65D 90/04

[52] U.S. Cl. .................... 220/453; 62/457; 220/902; 220/DIG. 6; 249/63; 249/112; 249/127; 249/175; 264/46.4; 264/46.9; 425/127; 425/817 R; 428/35

[58] Field of Search .............. 264/45.2, 46.4, 46.9; 220/1 C, 453, 902, DIG. 6; 428/35; 62/462, 457; 425/127, 817 R; 249/63, 112, 127, 175

[56] References Cited

U.S. PATENT DOCUMENTS

| | | | |
|---|---|---|---|
| 2,907,074 | 10/1959 | Rhodes | 264/45.2 |
| 3,007,594 | 11/1961 | Wallace | 264/46.4 X |
| 3,037,362 | 6/1962 | Wallace | 220/902 X |
| 3,186,118 | 6/1965 | Smith | 264/46.4 X |
| 3,248,461 | 4/1966 | Wiles et al. | 264/53 X |
| 3,258,511 | 6/1966 | McGregor, Jr. | 264/46.4 |
| 3,277,220 | 10/1966 | Plymale et al. | 264/45.4 |
| 3,389,824 | 6/1968 | Berchtold | 220/902 X |
| 3,435,101 | 3/1969 | Boorman | 264/45.2 |
| 3,576,930 | 4/1971 | Watters et al. | 264/46.4 X |
| 3,764,641 | 10/1973 | Ash | 264/45.2 |
| 3,871,521 | 3/1975 | Szatkowski | 220/902 X |
| 3,884,380 | 5/1975 | Prochnow et al. | 220/902 X |
| 3,985,511 | 10/1976 | Betts | 220/902 X |
| 4,042,142 | 8/1977 | Ruano | 220/DIG. 6 |

FOREIGN PATENT DOCUMENTS 2236742 2/1975 France ............ 220/DIG. 6

Primary Examiner—Philip Anderson
Attorney, Agent, or Firm—Rodgers & Rodgers

[57] ABSTRACT

An open container includes an outer part formed of molded polyurethane and an inner liner of preformed plastic material, the polyurethane being placed in an open mold cavity and a center core plug having a plastic liner disposed thereabout is inserted into the open mold cavity to occupy a predetermined positional relationship therewith so that when the polyurethane is allowed to foam, rise, set and cure, the liner is securely bonded thereto to form a mechanically strong heat insulated container for displaying consumer items such as soft drinks immersed in ice water disposed within the container.

20 Claims, 4 Drawing Figures

CONTAINER HAVING AN INTERNAL LINER TOGETHER WITH METHOD AND APPARATUS FOR FORMING SUCH CONTAINER

TECHNICAL FIELD

This invention relates to devices for displaying consumer items such as soft drinks immersed in ice water disposed within an open top container.

DISCLOSURE OF THE INVENTION

According to this invention in one form an open container comprising an outer part formed of molded polyurethane together with an inner liner of preformed plastic material is formed by placing polyurethane into an open mold cavity, placing a plastic liner over a center core plug and inserting said center core plug and liner into said open mold cavity so as to bond the urethane outer part to the liner and thereby to provide a mechanically strong and heat insulated container which is particularly well suited for receiving ice water and items to be displayed such as cold drinks.

BEST MODE OF CARRYING OUT THE INVENTION

Figure 1:
FIG. 1 is a perspective view of an open display container formed according to this invention.
Figure 2:
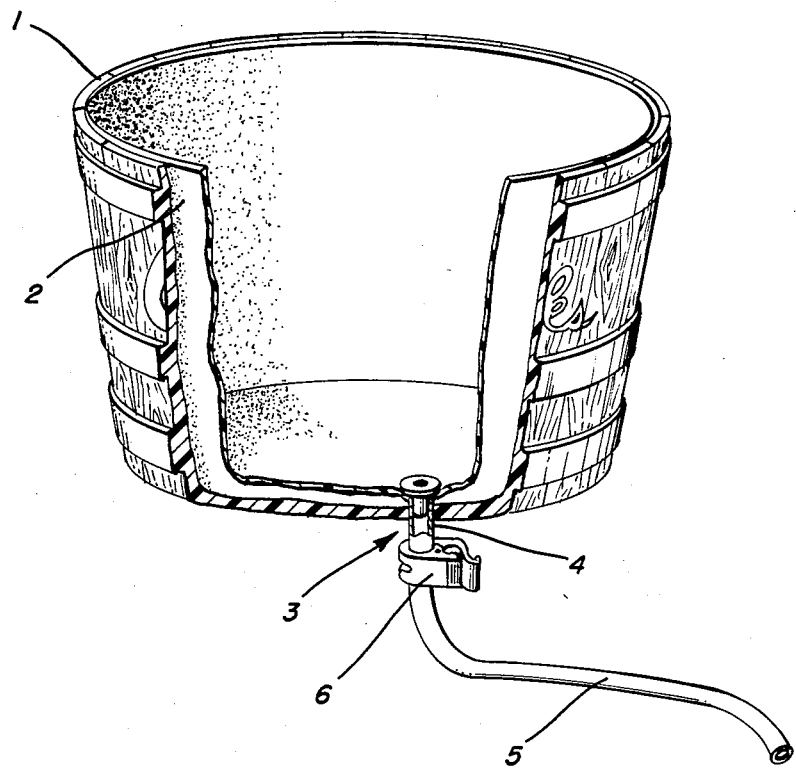
FIG. 2 is a view similar to FIG. 1 but with a part of the container broken away to reveal internal parts.

A container formed according to this invention and as shown in FIG. 1 and 2 comprises an outer part designated by the numeral 1 which is formed of molded polyurethane together with an inner preformed liner designated by the numeral 2. An outlet drain is designated by the numeral 3 and includes a flanged conduit 4 to which a flexible hose 5 is connected and on which a manually operable control valve 6 is mounted. Thus as ice within the container melts and additional ice is added, surplus water may be drained away by simply opening the valve 6. As is obvious in FIG. 1, suitable indicia generally indicated by the numeral 7 is disposed on the outer surface of the container and ordinarily constitutes the trade name of a soft drink or the like. Like the barrel hoops 7a the indicia 7 is embossed or upraised from the surface 7b.

Figure 3:
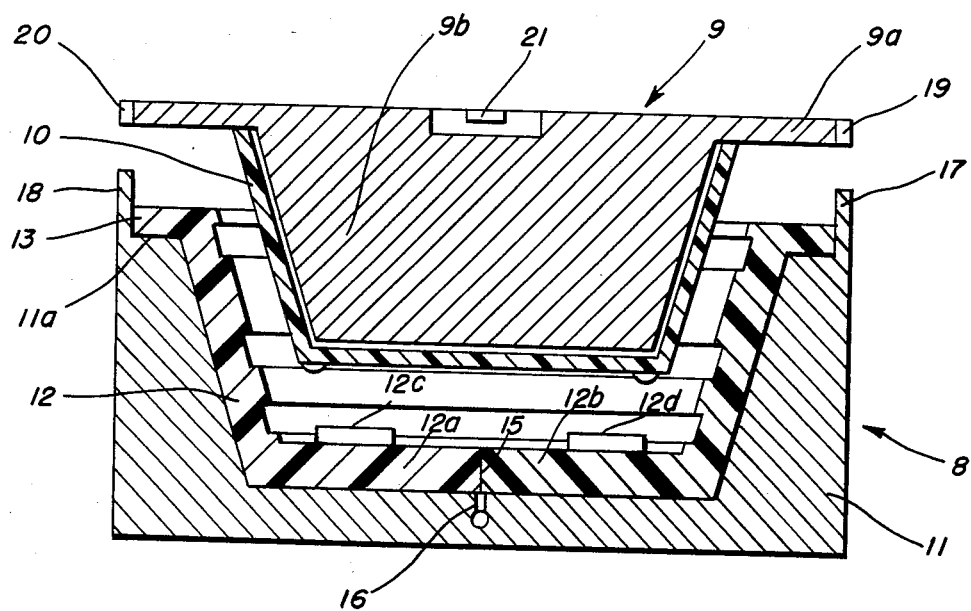
FIG. 3 is a cross-sectional view of an open mold cavity and associated center core plug with a container plastic liner disposed thereabout.

The mold shown in cross-section in FIG. 3 comprises an open mold cavity generally designated by the numeral 8 and a center core plug generally designated by the numeral 9 on which a preformed plastic liner designated by the numeral 10 is disposed. Preferably liner 10 is formed of polystyrene or polypropylene by injection molding or is vacuum formed via known processes.

Figure 4:
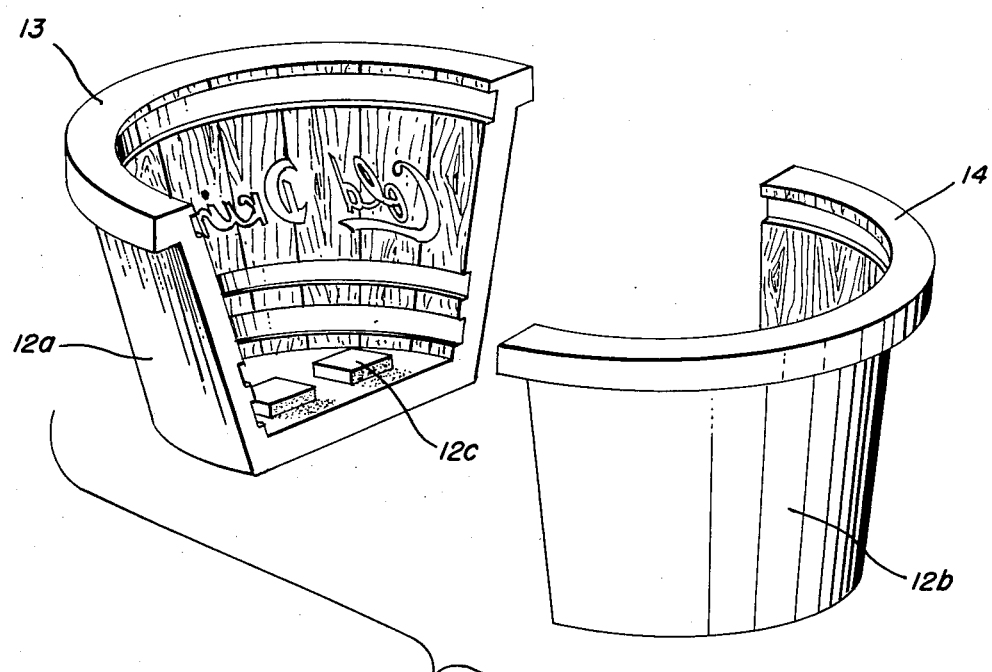
FIG. 4 is a perspective view of complementary parts of a removable inner casing of the open mold cavity which shows that such casing is formed of separate complementary parts.

The open mold cavity 8 includes a mechanically strong outer casing designated by the numeral 11 which may comprise fiberglass, epoxy, aluminum, wood or other suitable material. Disposed within the outer casing 11 is an inner casing 12 comprising two parts 12a and 12b and which preferably is formed of silicone mold material and which includes an upper shoulder flange 13, 14 which overlies the surface 11a of outer casing 11. The inner casing parts 12a and 12b constitute a pair of complementary mating half sections. These sections come into abutting contact at the junction line 15. These mating half sections are shown in perspective in FIG. 4. A fluid flow passage 16 is formed in the outer casing 11 and is interconnected with a source of fluid under pressure through a control valve neither of which is shown in the drawings and is for the purpose of supplying pressure fluid such as compressed air through the outer casing 11 and into pressure contact with the lower surface of liner 12 thereby to facilitate separation of the liner from the outer casing 11 upon completion of a molding operation.

The center core plug 9 comprises a top plate 9a and a center core plug 9b which is securely affixed to the undersurface of plate 9a.

For determining the positional relationship between the mold cavity 8 and the center core plug 9 while a molding process is underway, registering tabs 17 and 18 are formed on the upper outer edges of outer casing 11 and cooperate with complementary registering slots 19 and 20 which are formed about the periphery of plate 9a of center core plug 9. Thus with the center core plug 9 lowered into its lowermost molding position, tabs 17 and 18 enter slots 19 and 20 and preserve the proper positional relationship between the open mold cavity 8 and the center core plug 9.

At the beginning of a molding process, the center core plug 9 is completely removed to a position in which the preformed plastic liner 10 may be placed thereabout. Thereafter a supply of polyurethane foam is placed within the open mold cavity 8 followed by insertion of the center core plug 9 with the preformed liner 10 thereon into molding position. During this operation the center core plug and liner move downwardly into a position in which the registering tabs 17 and 18 cooperate with the registering slots 19 and 20 respectively. The open mold cavity and center core plug together with the liner and with the supply of polyurethane disposed within the open mold cavity are then placed in a molding press to allow the polyurethane to foam, rise, set and cure. This reaction and cure cycle ordinarly requires from about 9 to about 12 minutes. Following this period of time, the mold is removed from the press and the center core plug is removed from the open mold cavity. Removal of the cnter core plug does not result in removal of the plastic liner 10 because that liner during the molding process becomes mechanically bonded to the polyurethane which is now in generally barrel shaped configuration and which comprises molded and cured polyurethane.

The polyurethane outer part is molded to a thickness of approximately ⅜ inch to approximately ¾ inch and its density ordinarily is in the range of 16 to 18 pounds per cubic foot depending upon the insulating and mechanical requirements of the particular unit.

This composite structure with liner bonded therein is very strong mechanically due primarily to the reinforcing action of the liner and also the structure constitutes a good insulator due to the insulating property of the molded polyurethane.

In order to facilitate removal of the molded container from the open mold cavity 8, a handle 21 is mounted on plate 9a and a supply of pressure fluid such as air under pressure is supplied through conduit 16 and the completed container as well as the two parts 12a and 12b of the inner casing 12 are removed from the open mold cavity 8. Since the indicia such as that which is indicated by the numeral 7 in FIG. 1 as well as the barrel hoops 7a are upraised from the outer surface 7b of the container, it is obvious that these configurations are due to recessed areas on the inner surfaces of the inner casing elements 12a and 12b. Since the parts 12a and 12b are removable, it is obvious that separation of the completed container from the inner casing 12 is thus facilitated. If desired inwardly projecting parts 12c and 12d may be formed on the parts 12a and 12b respectively so as to form indentations on the bottom of the completed container which may conveniently receive portions of a suitable display stand on which the container may be mounted. Preferably the preformed plastic liner 10 is formed of styrene of propylene.

INDUSTRIAL APPLICABILITY

According to this invention, a mechanically strong, economical container is provided which has desirable heat insulating properties and which is especially suitable for use in displaying consumer items at points of purchase and the like.

I claim:

1. A method of forming a foamed polyurethane resin container having an internal liner, said method comprising the steps of pouring foamable polyurethane into an open mold cavity, placing a preformed plastic liner over a center core plug, inserting said center core plug and liner into said open mold cavity while the foamable polyurethane is in fluid condition, and forcing said center core plug and liner into a predetermined position within said open mold cavity and maintaining said center core plug and liner in said predetermined position for a period of time sufficient to allow said polyurethane to foam, rise, set and cure thereby to form the container about said liner.

2. A method according to claim 1 wherein said center core plug is withdrawn from said open mold cavity following completion of the coring of said foamable polyurethane and wherein said liner is separated from said center core plug during withdrawal thereof.

3. A method according to claim 2 wherein said liner is bonded to the inner surfaces of said foamable polyurethane container thereby to form a mechanically strong lined container and to facilitate separation of said center core plug from said liner during withdrawal thereof.

4. A method according to claim 2 wherein the container includes embossed areas on its outer surface and wherein the inner surfaces of said open mold cavity are formed in a removable inner casing formed of separate complementary parts having recessed areas for producing said embossed areas on the outer surface of the container and wherein said casing is removed from said container following withdrawal of said container from said open mold cavity.

5. A method according to claim 4 wherein said removable inner casing is disposed within an outer part of said open mold cavity and wherein fluid pressure is applied to the outer surface of said removable inner casing to facilitate removal thereof.

6. A method according to claim 5 wherein said removable inner casing is formed of silicone mold material.

7. A method according to claim 1 wherein said liner is preformed by injection molding.

8. A method according to claim 1 wherein said liner is vacuum formed.

9. An open container consisting essentially of an outer part formed of molded foamed polyurethane and an inner liner of preformed plastic material bonded to the inner surface of said outer part and made according to the method of claim 1.

10. A container according to claim 9 wherein said liner is formed of polystyrene.

11. A container according to claim 9 wherein said liner is formed of polypropylene.

12. An open container comprising an outer part formed of molded foamed polyurethane and an inner of preformed plastic material bonded to the inner surface of said outer part and wherein an outlet drain is formed via aligned passages in said outer part and in said inner liner and made according to the method of claim 1.

13. A container according to claim 9 wherein said outer part is of a thickness of approximately $\frac{5}{8}$ inch to $\frac{3}{4}$ inch and whose density is in the range of sixteen to eighteen pounds per cubit foot.

14. Apparatus for forming a container having an internal liner, said apparatus comprising an open mold including an outer casing formed of mechanically strong material and an inner casing formed of silicone mold material having an internal surface configured to form the external surface of the container, a center core plug having an outer surface which conforms generally to the configuration of the internal surface of said open mold and having external dimensions of less magnitude than the corresponding internal dimensions of said open mold so as to define a container forming cavity therebetween whereby a platic container liner initially disposed only about said center core plug an which is of such thickness as only partially to fill said container forming cavity thereby to provide space for receiving foramable polyurethane in said container forming cavity and forced into said space due to insertion of said center plug into said open mold with said liner thereon.

15. Apparatus according to claim 14 wherein said liner is bonded to the inner surface of the polyurethane container disposed thereabout due in part to shrinkage of said polyuretane during curing thereof whereby said liner is detached from said center core plug during withdrawal of said center core plug from said open mold cavity.

16. Apparatus according to claim 9 wherein said inner casing comprises a plurality of separate complementary parts whereby separation of the outer surface of the container from said inner casing is facilitated following completion of the curing of said polyurethane.

17. Apparatus according to claim 9 wherein at least one passage is formed in a part of said outer casing and arranged to establish communication between a source of fluid under pressure and an outer surface of said inner casing and wherein means are provided for controlling the flow of fluid under pressure through said passage thereby to facilitate removal of said inner casing from said outer casing following completion of a curing process.

18. Apparatus according to claim 14 wherein complementary registering means are formed on parts of said open mold and of said center core plug for establishing a proper positional relationship therebetween.

19. Apparatus according to claim 14 wherein a handle is mounted on said center core plug for facilitating removal thereof from said cavity following completion of a curing operation.

20. Apparatus according to claim 9 wherein the inner surface of said inner casing is formed with projections and recesses for forming complementary configurations on the outer surface of the container.

* * * * *